United States Patent
Becze (10) Patent No.: US 9,172,424 B2
(45) Date of Patent: Oct. 27, 2015

(54) NETWORK SELF-SYNCHRONIZATION USING ULTRA WIDE BAND (UWB) IMPULSE RADIO (IR) PULSE TRAIN WITH UNIQUE REPETITION RATES

(71) Applicant: QUALCOMM Incorporated, San Diego, CA (US)

(72) Inventor: Karoly Becze, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/196,995

(22) Filed: Mar. 4, 2014

(65) Prior Publication Data

US 2015/0256220 A1 Sep. 10, 2015

(51) Int. Cl.
| | |
|---|---|
| H04L 7/00 | (2006.01) |
| H04B 1/7183 | (2011.01) |
| H04W 64/00 | (2009.01) |
| H04W 24/06 | (2009.01) |
| H04W 56/00 | (2009.01) |

(52) U.S. Cl.
CPC ............. *H04B 1/7183* (2013.01); *H04W 24/06* (2013.01); *H04W 56/0015* (2013.01); *H04W 64/003* (2013.01)

(58) Field of Classification Search
CPC .................................. H04L 7/02; H04L 7/027
USPC ......... 375/238, 239, 242, 256, 354, 356, 364, 375/368
See application file for complete search history.

(56) References Cited

U.S. PATENT DOCUMENTS

| | | |
|---|---|---|
| 7,881,684 B2 | 2/2011 | Nakagawa et al. |
| 8,249,049 B2 | 8/2012 | Silverman et al. |
| 8,344,949 B2 | 1/2013 | Moshfeghi |
| 8,379,736 B2 | 2/2013 | Santhoff et al. |
| 2005/0018762 A1* | 1/2005 | Aiello et al. .................. 375/219 |
| 2008/0292037 A1* | 11/2008 | Fujita et al. ................... 375/354 |
| 2009/0036084 A1* | 2/2009 | Berens et al. ................. 455/296 |
| 2010/0040168 A1* | 2/2010 | Fujita et al. ................... 375/295 |
| 2010/0159842 A1* | 6/2010 | Fukagawa et al. ......... 455/67.11 |
| 2012/0147940 A1 | 6/2012 | Gierlich et al. |
| 2013/0137452 A1 | 5/2013 | Bevan et al. |

FOREIGN PATENT DOCUMENTS

| | | |
|---|---|---|
| WO | 0118997 A1 | 3/2001 |
| WO | 2005053248 A1 | 6/2005 |
| WO | 2012158578 A1 | 11/2012 |

OTHER PUBLICATIONS

International Search Report and Written Opinion—PCT/US2015/018526—ISA/EPO—Jun. 1, 2015.

* cited by examiner

*Primary Examiner* — Kevin Kim
(74) *Attorney, Agent, or Firm* — Novak Druce Connolly Bove + Quigg LLP (57) ABSTRACT

Described herein are techniques for self-synchronization of wireless nodes. For example, the technique may involve determining a repetition rate for receiving a signal from another access point, wherein the repetition rate identifies the another access point. The technique may also involve receiving at the access point an unmodulated impulse radio (IR) ultra wide band (UWB) pulse train from the another access point during a transmission interval associated with the repetition rate. The technique may also involve synchronizing a first clock associated with the access point to a clock associated with the another access point based on the received unmodulated IR UWB pulse train.

30 Claims, 6 Drawing Sheets

NETWORK SELF-SYNCHRONIZATION USING ULTRA WIDE BAND (UWB) IMPULSE RADIO (IR) PULSE TRAIN WITH UNIQUE REPETITION RATES

BACKGROUND

Aspects of the present disclosure relate generally to communication systems and to techniques for self-synchronization of wireless nodes.

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

Timing synchronization may be an important aspect of wireless network nodes. For example, timing synchronization may provide information to determine a local position of each network node and/or user equipments. In an example, indoor positioning may be desirable. In some systems, satellite-based approaches such as Global Position System (GPS), Global Navigation Satellite System (GLONASS), Galileo, etc. signals may be used for timing synchronization and/or positioning. In some cases, the satellite-based approaches may not be available or may not be desirable. In this context, there remains a need for methods and systems for timing synchronization and/or positioning of network nodes using signaling between the network nodes.

SUMMARY

Illustrative aspects of the present disclosure that are shown in the drawings are summarized below. These and other aspects are more fully described in the detailed description section. It is to be understood, however, that the disclosure is not limited to the forms described in this Summary or in the detailed description.

In accordance with one or more aspects described herein, there is provided a method for synchronizing an access point in a wireless communication system. The method may include determining a repetition rate for receiving a signal from another access point, wherein the repetition rate identifies the another access point. The method may include receiving at the access point an unmodulated impulse radio (IR) ultra wide band (UWB) pulse train from the another access point during a transmission interval associated with the repetition rate. The method may include synchronizing a first clock associated with the access point to a clock associated with the another access point based on the received unmodulated IR UWB pulse train.

In another aspect, an apparatus may be provided for synchronizing an access point in a wireless communication system. The apparatus may include means for determining a repetition rate for receiving a signal from another access point, wherein the repetition rate identifies the another access point. The apparatus may include means for receiving at the access point an unmodulated IR ultra wide band UWB pulse train from the another access point during a transmission interval associated with the repetition rate. The apparatus may include means for synchronizing a first clock associated with the access point to a clock associated with the another access point based on the received unmodulated IR UWB pulse train.

In yet another aspect, an apparatus may be provided for synchronizing an access point in a wireless communication system. The apparatus may include at least one processor configured for determining a repetition rate for receiving a signal from another access point, wherein the repetition rate identifies the another access point. The apparatus may include at least one transceiver configured for receiving at the access point an unmodulated IR ultra wide band UWB pulse train from the another access point during a transmission interval associated with the repetition rate. The at least one processor is further configured for synchronizing a first clock associated with the access point to a clock associated with the another access point based on the received unmodulated IR UWB pulse train. The apparatus may include a memory coupled to the at least one processor for storing data.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Deployment of small cells may include new approaches to timing synchronization of the small cells. These approaches may include using ultra wide band (UWB) transmissions between small cells for self-synchronization of the small cells. UWB transmissions provide accuracy and other advantages such as a high level of penetration in areas such as in door facilities, buildings, etc. In such areas, positioning methods based on, e.g., Global Position System (GPS) may be not accurate or may not be available. Accordingly, self-synchronization using UWB transmissions may be advantageous.

For example, small cells may synchronize using periodic UWB pulse-train transmissions between the small cells. Each small cell may have a predetermined repetition rate, e.g., based on a clock rate, for transmission of the pulse-train. The predetermined rate for each small cell may be shared and known by the other small cells, thereby enabling the small cells to identify each other and/or sources of the transmissions. A receiving small cell may use information for the repetition rates and UWB pulse-train characteristics for synchronizing a clock and/or determining a position of the small cell. In some cases, accumulated signals may be used for the synchronization and/or positioning.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
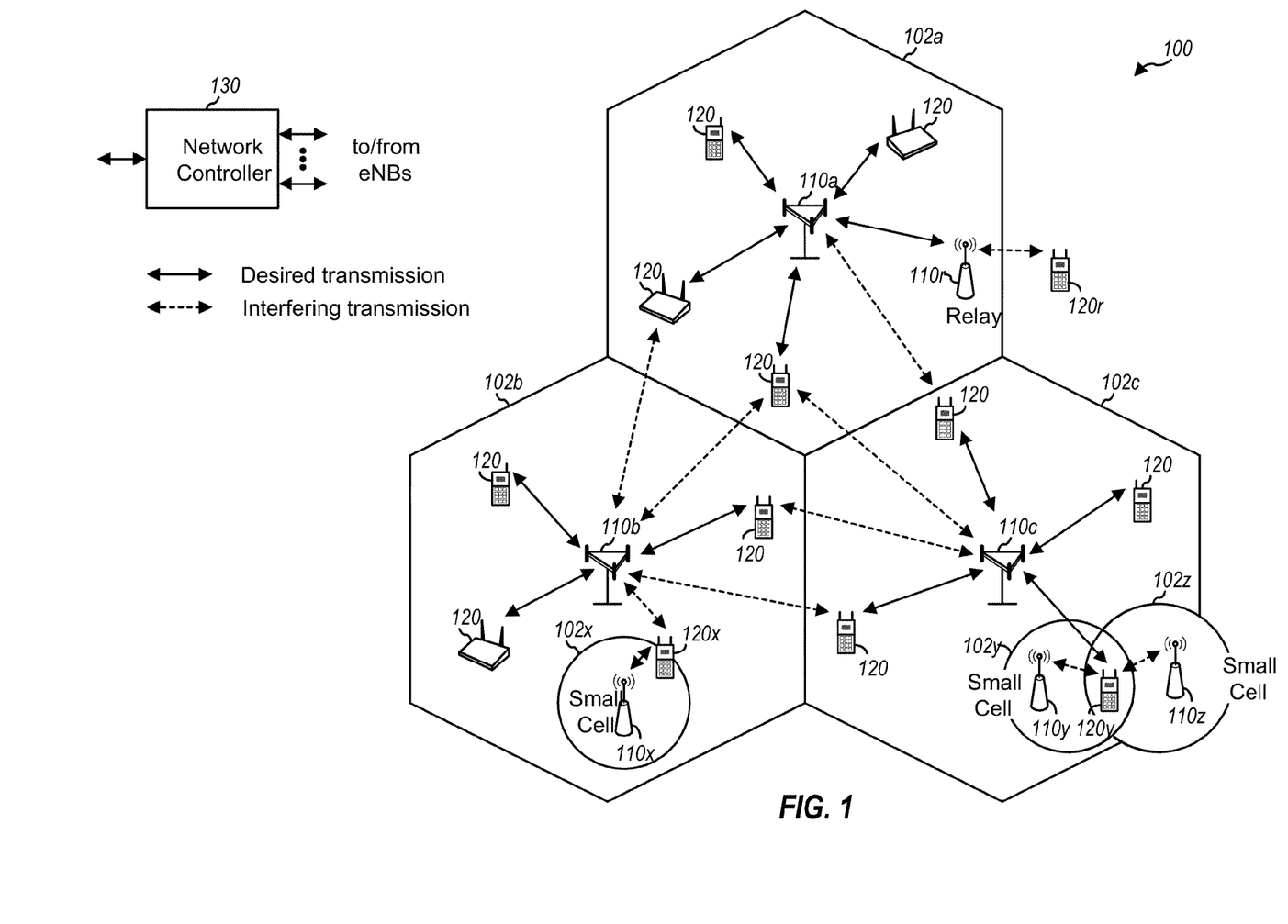
FIG. 1 is a block diagram conceptually illustrating an example of a telecommunications system.

FIG. 1 shows a wireless communication network 100. The wireless network 100 may include a number of base stations 110, which may be an eNB in the example of an LTE system, and other network entities. A base station may communicate with mobile stations, which may be user equipments (UEs) in the example of an LTE system, and may also be referred to as Node B, an access point, or other term. Each base station 110a, 110b, 110c may provide communication coverage for a particular geographic area. In 3GPP, the term "cell" can refer to a coverage area of a base station and/or a base station subsystem serving this coverage area, depending on the context in which the term is used.

A base station may provide communication coverage for a large cell (e.g., a macro cell) or a small cell (e.g., a pico cell, a femto cell, and/or other types of cell). A macro cell may cover a relatively large geographic area (e.g., several kilometers in radius) and may allow unrestricted access by UEs with service subscription. A pico cell may cover a relatively small geographic area and may allow unrestricted access by mobile stations with service subscription. A small cell may cover a relatively small geographic area (e.g., a home) and may allow restricted access by mobile stations having association with the small cell (e.g., UEs in a Closed Subscriber Group (CSG), UEs for users in the home, etc.). A base station for a macro cell may be referred to as a macro base station. A base station for a pico cell may be referred to as a pico base station. A base station for a small cell may be referred to as a femto base station or a home base station or home eNB (HNB). In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base stations for the small cells 102y and 102z, respectively. A base station may support one or multiple (e.g., three) cells.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
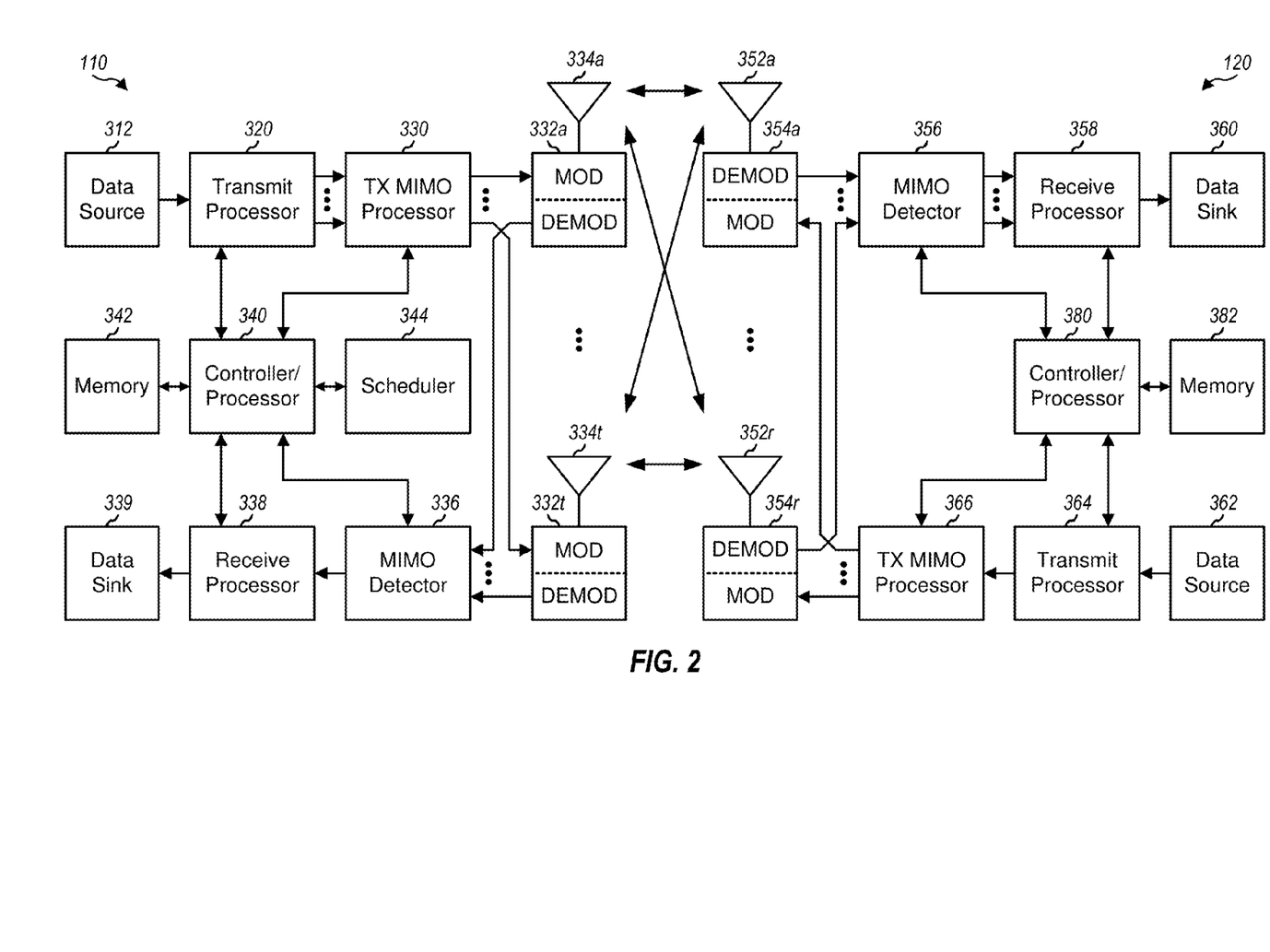
FIG. 2 is a block diagram conceptually illustrating a design of a base station/eNB and a UE.

FIG. 2 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a small cell. A small cell may include a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In some instances, it may be desirable to synchronize the base stations. For example, positioning services such as GPS may not be available to the base stations. In an example, indoor positioning of the base stations may be desirable. Embodiments for positioning may be based on various techniques including received strength indicator (RSSI)-based techniques, IEEE 802.15a, sensor-aided techniques, time difference of arrival (TDOA)-based techniques, etc.

Some methods for positioning may involve high-current consumption hardware, expensive hardware, or methods that may be inaccurate. The various embodiments below for synchronization and positioning may require no extra hardware. For example, the various embodiments may be implemented based on existing hardware and/or software in a mobile station or base station. In an example, the techniques may be implemented using Wi-Fi access points or small cells. In the disclosure below, access points and small cells may be used interchangeably with Node Bs or eNode Bs.

Determining the position of a node may be based on a notion of time. For example, time of arrival (TOA), time of flight (TOF), and TDOA may be used for determining the position of the node. TDOA positioning using small cells such as LTE cells may provide an accuracy of, e.g., 3 to 5 meters. These small cells using TDOA positioning, however, may synchronize using a common clock which may not be available in all installations (e.g., commercial installations of the small cells), and the common clock and other components may be a significant cost to add to commercial deployments.

In one embodiment, the small cells may be synchronized wirelessly to a degree of less than a defined threshold (e.g., one nanosecond) accuracy (e.g., one foot of error) using wireless transmission such as UWB transmissions. Using UWB may be beneficial for the following reasons. For example, UWB transmissions may not be affected by multipath transmission losses. One of the largest sources of transmission errors in a wireless system (e.g., an indoor system) may be the multipath transmissions losses. UWB transmission may be royalty free or license free. Another advantage of using UWB may include high penetration levels. For example, UWB signals may penetrate walls and other objects (e.g., non-metal objects). UWB transmissions may have a high timing resolution providing for better accuracy. UWB transmissions may provide a large bandwidth with high positioning accuracy. Another advantage for UWB transmissions may include a high light of sight (LOS) transmission distance that may be up to, e.g., 450 meters or more.

The proposed solution may be to synchronize the small cells using periodic UWB pulse-trains with unique repetition rates. For example, the repetition rate may be a clock rate of a small cell, or a multiple (e.g., integer multiple) of the clock rate. A set of repetition rates may be provided for use by the small cells. For example, the set of repetition rates may include, e.g., unique, values such that any two in the set are relatively prime to each other, etc. Each small cell may be equipped with at least one UWB transmitter and at least one UWB receiver (or at least two in some cases). Each small cell may receive a dedicated neighbor's UWB pulse train and synchronize its internal clock to the received pulse train. Then the small cell may transmit its own unique repetition rate UWB pulse train for its neighbors for synchronize to. As the small cell is equipped with at least one receiver, the small cell may also sequentially listen and measure the time difference (and hence the distance) to its own neighbors, and thereby allow the small cell to triangulate its own position, i.e., the network may self-calibrate and map itself.

In some cases UWB IR radios may not be low-cost and may not have low-power consumption, however, in this case the UWB pulse train may be carrying only its periodic repetition rate which allows the power of the received signal to be accumulated allowing the use of less expensive and less complicated hardware. For example, an aggregate signal may be derived from the accumulated signals. The aggregated signal may be used for the synchronization. The UWB signals may not carry any information other than timing information. As only the synchronization of the small cell is required, a UE may not be burdened with the cost of UWB hardware. The synchronization method may enable other TDOA based wireless positioning techniques to be used.

Accumulating the received signal to provide the aggregate signal may provide advantages. For example, a small cell may determine a strongest aggregate signal from its neighbor small cells, and use the strongest aggregate signal to synchronize its clock. In another example, the small cell may determine a closest neighbor small cell based on the aggregate signals, and use the closed neighbor small's signals to synchronize its clock. In one example, the aggregated signals from one or more of the small cells may be weighed to minimize errors.

Figure 3:
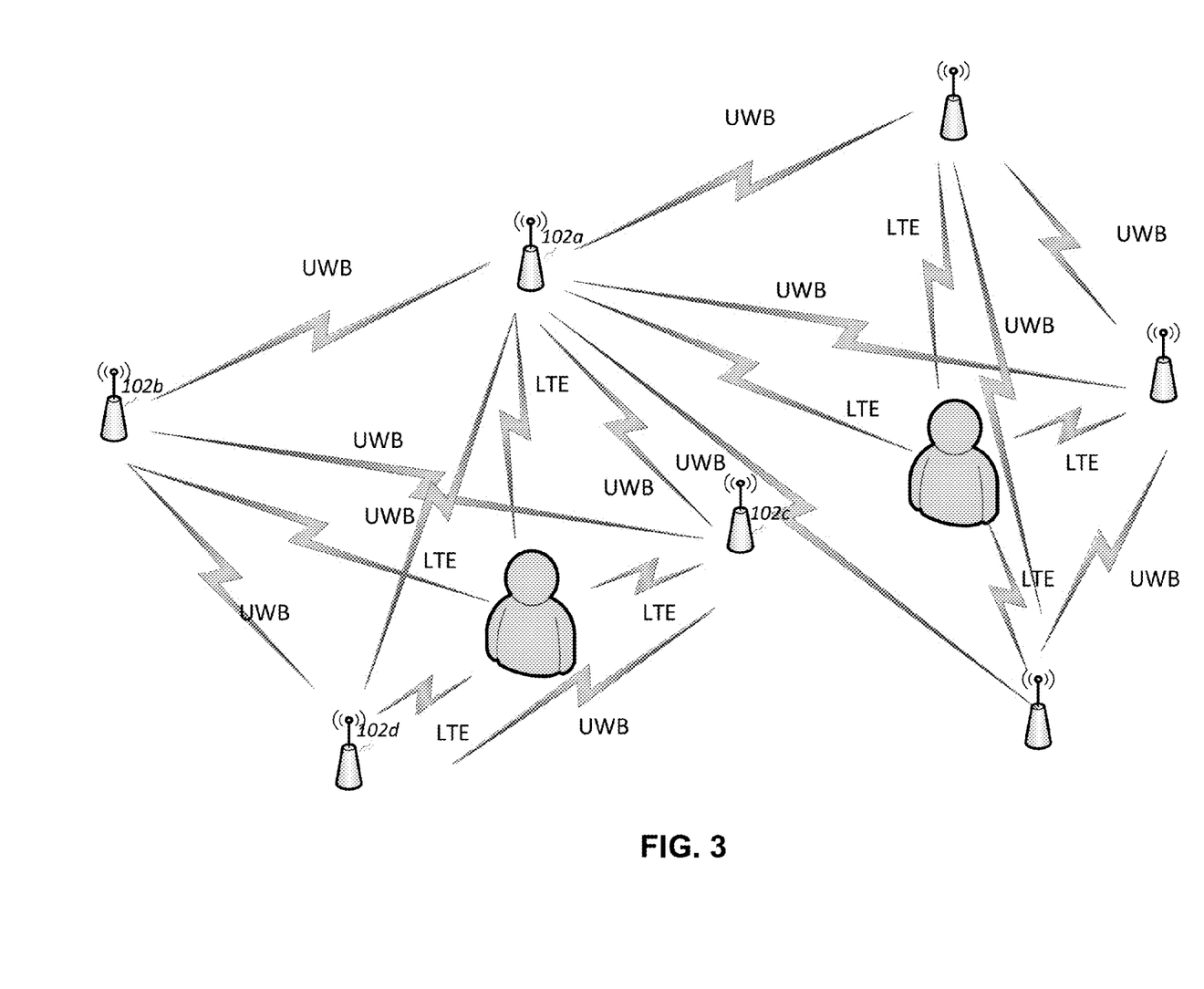
FIG. 3 illustrates an example network using LTE positioning and UWB synchronization.

FIG. 3 illustrates an example network using LTE positioning and UWB synchronization. In the example of FIG. 3, the small cells 102a-d in may be configured for synchronization based on the UWB IR pulse trains. For example, small cell 102a may initially be deployed to serve a set of users. The first small cell in the deployment may be seeded or configured with a time (e.g., from the network or configured by an owner/operator). Small cell 102b, 102c may be deployed subsequent to the deployment of 102a. In this case, small cells 102b, 102c may not have a synchronized time. Small cell 102a may broadcast a pulse train, e.g., UWB IR pulse train, at a unique repetition rate. Small cell 102b may receive the pulse train and determine a time based on the received pulse train. For example, small cell 102b may determine a time different of arrival of the pulse train from small cell 102a. Based on the time different of arrival, small cell 102b may synchronize its clock to the clock of small cell 102a. Small cell 102b may determine a source/origination time of the pulse train for synchronization. Small cell 102b may then broadcast its own pulse train based on a unique repetition rate.

Small cell 102c may receive either or both the pulse trains from small cells 102a, 102b. Small cell 102c may synchronize its clock based on the received pulse trains. Small cells 102a, 102b, 102c may also determine distances to other small cells, relative positions, absolute positions, etc. of the other nodes based on the pulse trains. Each small cell may map itself or other nodes based on the pulse train information. One skilled in the art will readily recognize that the order of the synchronization may occur in another sequence. For example, small cell 102c or 102d may synchronize their time first prior to small cell 102b. In another example, small cells 102b-d may synchronize their times simultaneously.

Figure 4:
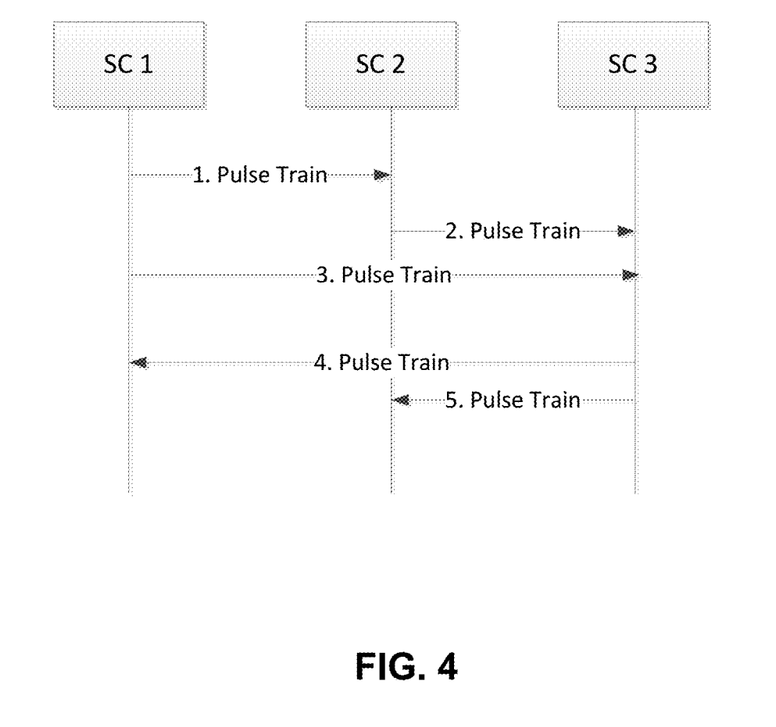
FIG. 4 illustrates an example call flow diagram for a set of small cells 1-3.

FIG. 4 illustrates an example call flow diagram for a set of small cells 1-3. The small cells 1-3 may be configured for synchronization based on the UWB IR pulse trains. For example, SC 1 may initially be deployed to serve a set of users. SC 1 may be seeded or configured with a time (e.g., from the network or configured by an owner/operator). SC 2 and SC 3 may be deployed subsequent to the deployment of SC 1. In this case, SC 2 and SC 3 may not have a synchronized time. SC 2 may receive the pulse train from SC 1 at step 1. Based on the received pulse train, SC 2 may synchronize its time to the clock of SC 1.

At step 2, SC 2 may broadcast its pulse train where it is received at SC 3. Based on the received pulse train, SC 3 may synchronize its time to the clock of SC 2. Optionally at step 3, SC 3 may also receive the pulse train from SC 1 for synchronization or to calibrate the block of SC 3. At steps 4 and 5, SC 3 may broadcast its pulse train, where it is received by SC 1 and SC 2. SCs 1-3 may also determine distances to the other small cells 1-3, relative positions, absolute positions, etc. of the other small cells SC 1-3 based on the pulse trains. Each SC 1-3 may map itself or other small cells based on the pulse train information.

Figure 5:
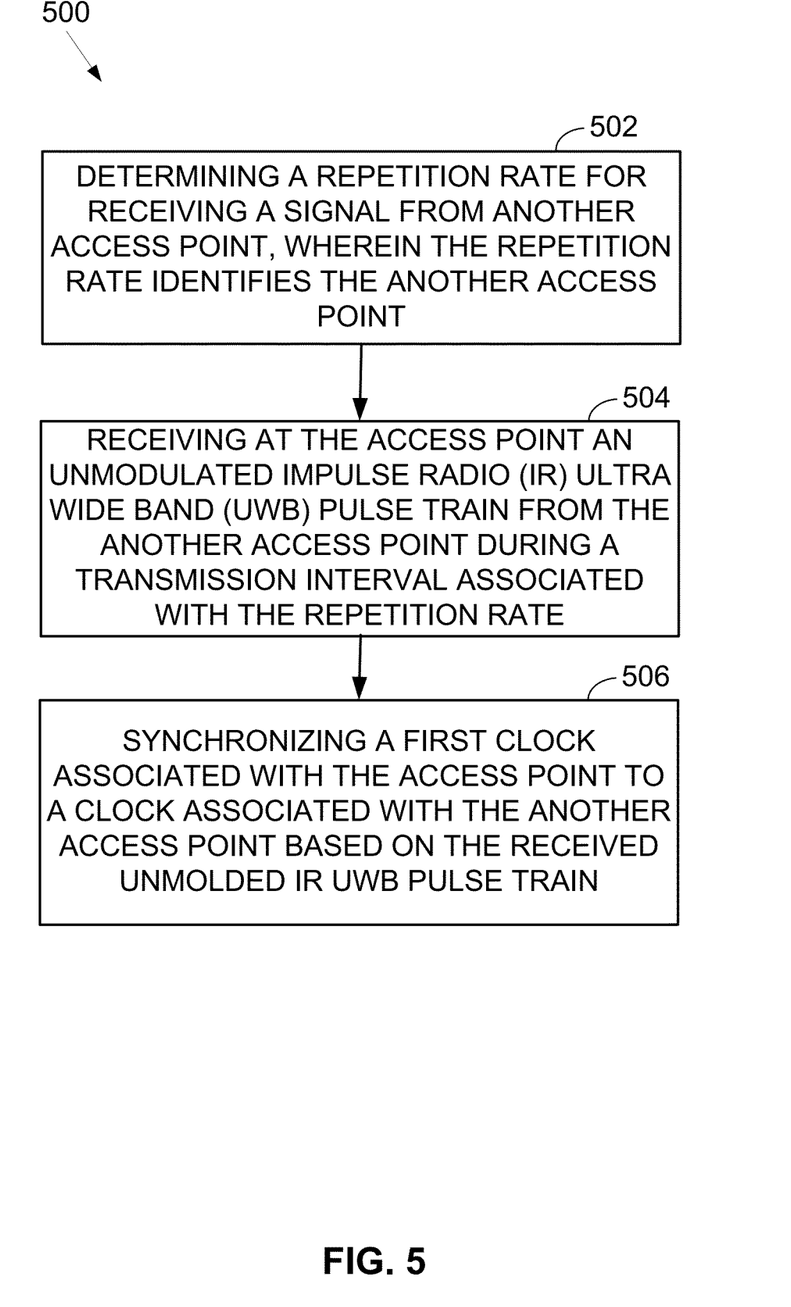
FIG. 5 illustrates an exemplary methodology for self-synchronization of a network node.

In accordance with one or more aspects of the embodiments described herein, with reference to FIG. 5, there is shown a methodology 500, operable by a network entity, such as, for example, a small cell, femtocell, a macrocell, a picocell, or the like. Specifically, method 500 describes a procedure for self-synchronization of a network node (e.g., the small cell). The method 500 may involve, at 502, determining a repetition rate for receiving a signal from another access point, wherein the repetition rate identifies the another access point. The method 500 may involve, at 504, receiving at the access point an unmodulated IR UWB pulse train from the another access point during a transmission interval associated with the repetition rate. The method 500 may involve, at 506, synchronizing a first clock associated with the access point to a clock associated with the another access point based on the received unmodulated IR UWB pulse train.

Figure 6:
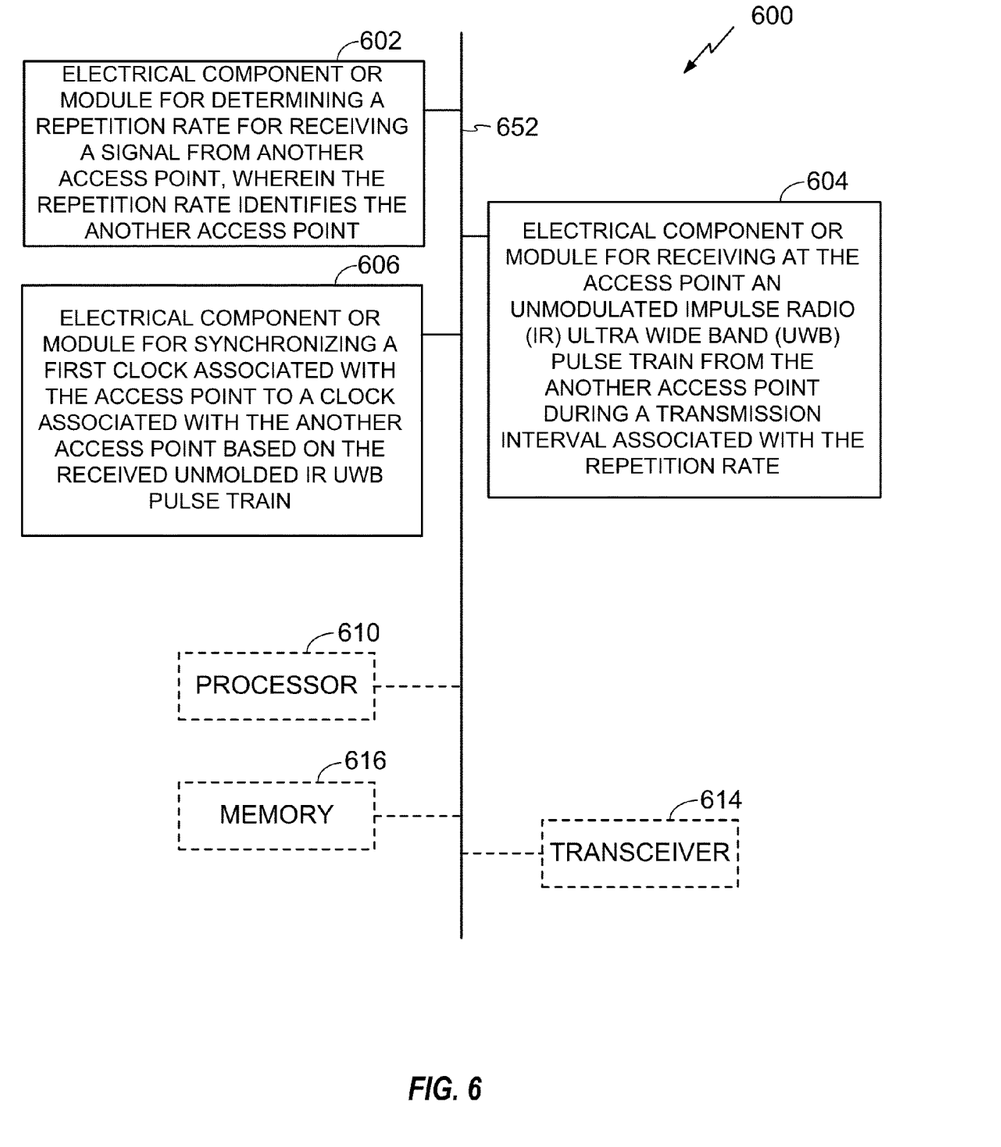
FIG. 6 shows an embodiment of an apparatus for self-synchronization of a network node, in accordance with the methodology of FIG. 5.

FIG. 6 shows an embodiment of an apparatus for self-synchronization of a network node, in accordance with the methodology of FIG. 5. With reference to FIG. 6, there is provided an exemplary apparatus 600 that may be configured as a network entity (e.g., a small cell, a femtocell, a macrocell, a picocell, or the like) in a wireless network, or as a processor or similar device/component for use within the network entity. The apparatus 600 may include functional blocks that can represent functions implemented by a processor, software, or combination thereof (e.g., firmware). For example, apparatus 600 may include an electrical component or module 602 for determining a repetition rate for receiving a signal from another access point, wherein the repetition rate identifies the another access point. The apparatus 600 may include an electrical component or module 604 for receiving at the access point an unmodulated IR UWB pulse train from the another access point during a transmission interval associated with the repetition rate. The apparatus 600 may include an electrical component or module 606 for synchronizing a first clock associated with the access point to a clock associated with the another access point based on the received unmodulated IR UWB pulse train.

In related aspects, the apparatus 600 may optionally include a processor component 610 having at least one processor, in the case of the apparatus 600 configured as a network entity (e.g., a femtocell, a macrocell, a picocell, or the like), rather than as a processor. The processor 610, in such case, may be in operative communication with the components 602-606 via a bus 652 or similar communication coupling. The processor 610 may effect initiation and scheduling of the processes or functions performed by electrical components 602-606.

In further related aspects, the apparatus 600 may include a radio transceiver component 614. A stand alone receiver and/or stand alone transmitter may be used in lieu of or in conjunction with the transceiver 614. When the apparatus 600 is a network entity, the apparatus 600 may also include a network interface (not shown) for connecting to one or more core network entities. The apparatus 600 may optionally include a component for storing information, such as, for example, a memory device/component 616. The computer readable medium or the memory component 656 may be operatively coupled to the other components of the apparatus 600 via the bus 652 or the like. The memory component 616 may be adapted to store computer readable instructions and data for effecting the processes and behavior of the components 602-606, and subcomponents thereof, or the processor 610, or the methods disclosed herein. The memory component 616 may retain instructions for executing functions associated with the components 602-606. While shown as being external to the memory 616, it is to be understood that the components 602-606 can exist within the memory 616. It is further noted that the components in FIG. 6 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for synchronizing an access point in a wireless communication system, the method comprising:
   determining a repetition rate for receiving a signal from another access point, wherein the repetition rate identifies the another access point;
   receiving at the access point an unmodulated impulse radio (IR) ultra wide band (UWB) pulse train from the another access point during a transmission interval associated with the repetition rate; and synchronizing a first clock associated with the access point to a clock associated with the another access point based on the received unmodulated IR UWB pulse train.

2. The method of claim 1, wherein the repetition rate comprises an integer multiple of a clock rate associated with the another access point.

3. The method of claim 1, further comprising:
receiving at least one other unmodulated IR UWB pulse train from the another access point; and
deriving an aggregate signal from the another access point based on accumulating the unmodulated IR UWB pulse train and at least one other unmodulated IR UWB pulse train, wherein the synchronizing the first clock is based on the aggregate signal.

4. The method of claim 3, further comprising:
deriving at least one other aggregate signal from at least one other access point;
determining at least one of a strongest aggregate signal or a closest access point based on the aggregate signal and the at least one other aggregate signal; and
synchronizing the first clock based on one of the strongest aggregate signal or the closest access point.

5. The method of claim 4, wherein synchronizing the first clock is based on a weighted value configured to minimize errors of the aggregate signal and the at least one other aggregate signal.

6. The method of claim 1, further comprising:
determining a second repetition rate of the access point; and
broadcasting unmodulated impulse radio (IR) ultra wide band (UWB) pulse train at the determined second repetition rate.

7. The method of claim 1, further comprising:
determining at least one relative position or at least one absolute position of at least one other neighbor access point based on the unmodulated IR UWB pulse train; and
determining a position of the access point based in part on the at least one relative position or the at least one absolute position.

8. The method of claim 1, further comprising:
receiving, over a backhaul, at least one of a UWB range, another repetition rate, a delay associated with the another access point, or any combination thereof, wherein determining the repetition rate is based on the received another repetition rate.

9. The method of claim 1, wherein a plurality of repetition rates comprises a set of values with any two values of the set being relatively prime, wherein the another access point is assigned one of the values in the set as the repetition rate.

10. An apparatus for synchronizing an access point in a wireless communication system, the apparatus comprising:
means for determining a repetition rate for receiving a signal from another access point, wherein the repetition rate identifies the another access point;
means for receiving at the access point an unmodulated impulse radio (IR) ultra wide band (UWB) pulse train from the another access point during a transmission interval associated with the repetition rate; and
means for synchronizing a first clock associated with the access point to a clock associated with the another access point based on the received unmodulated IR UWB pulse train.

11. The apparatus of claim 10, further comprising:
means for receiving at least one other unmodulated IR UWB pulse train from the another access point; and
means for deriving an aggregate signal from the another access point based on accumulating the unmodulated IR UWB pulse train and at least one other unmodulated IR UWB pulse train, wherein the synchronizing the first clock is based on the aggregate signal.

12. The apparatus of claim 11, further comprising:
means for deriving at least one other aggregate signal from at least one other access point;
means for determining at least one of a strongest aggregate signal or a closest access point based on the aggregate signal and the at least one other aggregate signal; and
means for synchronizing the first clock based on one of the strongest aggregate signal or the closest access point.

13. The apparatus of claim 12, wherein synchronizing the first clock is based on a weighted value configured to minimize errors of the aggregate signal and the at least one other aggregate signal.

14. The apparatus of claim 10, further comprising:
means for determining a second repetition rate of the access point; and
means for broadcasting unmodulated impulse radio (IR) ultra wide band (UWB) pulse train at the determined second repetition rate.

15. The apparatus of claim 10, further comprising:
means for determining at least one relative position or at least one absolute position of at least one other neighbor access point based on the unmodulated IR UWB pulse train; and
means for determining a position of the access point based in part on the at least one relative position or the at least one absolute position.

16. An apparatus for synchronizing an access point in a wireless communication system, the apparatus comprising:
at least one processor configured for determining a repetition rate for receiving a signal from another access point, wherein the repetition rate identifies the another access point;
at least one transceiver configured for receiving at the access point an unmodulated impulse radio (IR) ultra wide band (UWB) pulse train from the another access point during a transmission interval associated with the repetition rate,
wherein the at least one processor is further configured for synchronizing a first clock associated with the access point to a clock associated with the another access point based on the received unmodulated IR UWB pulse train; and
a memory coupled to the at least one processor for storing data.

17. The apparatus of claim 16, wherein the at least one transceiver is further configured for receiving at least one other unmodulated IR UWB pulse train from the another access point, and
the at least one processor is further configured for deriving an aggregate signal from the another access point based on accumulating the unmodulated IR UWB pulse train and at least one other unmodulated IR UWB pulse train, wherein the synchronizing the first clock is based on the aggregate signal.

18. The apparatus of claim 17, the at least one processor is further configured for:
deriving at least one other aggregate signal from at least one other access point;
determining at least one of a strongest aggregate signal or a closest access point based on the aggregate signal and the at least one other aggregate signal; and synchronizing the first clock based on one of the strongest aggregate signal or the closest access point.

19. The apparatus of claim 18, wherein synchronizing the first clock is based on a weighted value configured to minimize errors of the aggregate signal and the at least one other aggregate signal.

20. The apparatus of claim 16, wherein the at least one processor is further configured for determining a second repetition rate of the access point; and the at least one transceiver is further configured for broadcasting unmodulated impulse radio (IR) ultra wide band (UWB) pulse train at the determined second repetition rate.

21. The apparatus of claim 16, wherein the at least one processor is further configured for:

determining at least one relative position or at least one absolute position of at least one other neighbor access point based on the unmodulated IR UWB pulse train; and determining a position of the access point based in part on the at least one relative position or the at least one absolute position.

22. The apparatus of claim 16, wherein the at least one transceiver is further configured for receiving, over a backhaul, at least one of a UWB range, another repetition rate, a delay associated with the another access point, or any combination thereof, wherein determining the repetition rate is based on the received another repetition rate.

23. The apparatus of claim 16, wherein a plurality of repetition rates comprises a set of values with any two values of the set being relatively prime, wherein the another access point is assigned one of the values in the set as the repetition rate.

24. A non-transitory computer readable medium storing code comprising instructions for causing at least one computer to:

determine a repetition rate for receiving a signal from another access point, wherein the repetition rate identifies the another access point;

receive at the access point an unmodulated impulse radio (IR) ultra wide band (UWB) pulse train from the another access point during a transmission interval associated with the repetition rate; and synchronize a first clock associated with the access point to a clock associated with the another access point based on the received unmodulated IR UWB pulse train.

25. The non-transitory computer readable medium of claim 24, further comprising instructions to:

receive at least one other unmodulated IR UWB pulse train from the another access point; and derive an aggregate signal from the another access point based on accumulating the unmodulated IR UWB pulse train and the at least one other unmodulated IR UWB pulse train, wherein the synchronizing the first clock is based on the aggregate signal.

26. The non-transitory computer readable medium of claim 25, further comprising instructions to:

derive at least one other aggregate signal from at least one other access point;

determine at least one of a strongest aggregate signal or a closest access point based on the aggregate signal and the at least one other aggregate signal; and synchronize the first clock based on one of the strongest aggregate signal or the closest access point.

27. The non-transitory computer readable medium of claim 26, wherein synchronizing the first clock is based on a weighted value configured to minimize errors of the aggregate signal and the at least one other aggregate signal.

28. The non-transitory computer readable medium of claim 24, further comprising instructions stores to:

determine a second repetition rate of the access point; and broadcast unmodulated impulse radio (IR) ultra wide band (UWB) pulse train at the determined second repetition rate.

29. The non-transitory computer readable medium of claim 24, further comprising instructions to:

determine at least one relative position or at least one absolute position of at least one other neighbor access point based on the unmodulated IR UWB pulse train; and determine a position of the access point based in part on the at least one relative position or the at least one absolute position.

30. The non-transitory computer readable medium of claim 24, further comprising instructions to:

receive, over a backhaul, at least one of a UWB range, another repetition rate, a delay associated with the another access point, or any combination thereof, wherein determining the repetition rate is based on the received another repetition rate.

* * * * *